US011582163B2

(12) United States Patent
Dhanabalan et al.

(10) Patent No.: US 11,582,163 B2
(45) Date of Patent: *Feb. 14, 2023

(54) SYSTEM FOR EARLY SYSTEM RESOURCE CONSTRAINT DETECTION AND RECOVERY

(71) Applicant: Citrix Systems, Inc., Fort Lauderdale, FL (US)

(72) Inventors: Praveen Raja Dhanabalan, Bengaluru (IN); Chaitra Maraliga Ramaiah, Bengaluru (IN)

(*) Notice: Subject to any disclaimer, the term of this patent is extended or adjusted under 35 U.S.C. 154(b) by 82 days.

This patent is subject to a terminal disclaimer.

(21) Appl. No.: 17/109,904

(22) Filed: Dec. 2, 2020

(65) Prior Publication Data

US 2021/0092070 A1 Mar. 25, 2021

Related U.S. Application Data

(63) Continuation of application No. 16/133,347, filed on Sep. 17, 2018, now Pat. No. 10,868,770, which is a continuation of application No. 14/846,417, filed on Sep. 4, 2015, now Pat. No. 10,091,124.

(51) Int. Cl.
*H04L 47/625* (2022.01)
*H04L 47/2441* (2022.01)

(52) U.S. Cl.
CPC ...... *H04L 47/6255* (2013.01); *H04L 47/2441* (2013.01)

(58) Field of Classification Search
CPC .................. H04L 47/6255; H04L 47/2441
USPC .......................................... 370/235
See application file for complete search history.

(56) References Cited

U.S. PATENT DOCUMENTS

| 6,560,243 | B1 | 5/2003 | Mogul | |
| 2007/0076726 | A1* | 4/2007 | Weston | H04L 47/10 |
| | | | | 709/225 |
| 2010/0182905 | A1 | 7/2010 | Matsushita et al. | |
| 2010/0232427 | A1 | 9/2010 | Matsushita et al. | |
| 2011/0211449 | A1* | 9/2011 | Attar | H04L 47/10 |
| | | | | 370/235 |
| 2012/0092996 | A1 | 4/2012 | Lautenschlaeger | |

(Continued)

OTHER PUBLICATIONS

Allman, et al., "Increasing TCP's Initial Window," Network Working Group Standards Track, Oct. 2002, 15 pages, The Internet Society.

(Continued)

*Primary Examiner* — Chi Tang P Cheng

(57) ABSTRACT

A system for optimizing network traffic is described. The system includes a quality of service (QoS) engine configured to acquire information regarding a plurality of data packets comprising a plurality of data packet flows operating over a plurality of links. The QoS engine can be further configured to determine a flow priority to the plurality of data packets flows, and to determine TCP characteristics for the plurality of data packet flows. The system further includes a TCP controller configured to acquire the flow priority to the plurality of data packets from the QoS engine. The TCP controller can be configured to obtain queue information associated with the plurality of data packets, and adjust a receive window size based on the flow priority and the queue information.

16 Claims, 7 Drawing Sheets

(56) References Cited

U.S. PATENT DOCUMENTS

| | | | |
|---|---|---|---|
| 2012/0106342 A1* | 5/2012 | Sundararajan | H04L 47/193 |
| | | | 370/235 |
| 2012/0303725 A1 | 11/2012 | Sato et al. | |
| 2013/0281098 A1 | 10/2013 | Fujii et al. | |
| 2013/0343398 A1* | 12/2013 | Sarca | H04L 47/32 |
| | | | 370/412 |
| 2015/0281106 A1 | 10/2015 | Lee et al. | |

OTHER PUBLICATIONS

Final Office Action for U.S. Appl. No. 14/846,417 dated Nov. 2, 2017.
Final Office Action on U.S. Appl. No. 16/133,347 dated Apr. 6, 2020.
Final Office Action on U.S. Appl. No. 16/133,347 dated May 23, 2019.
Non-Final Office Action for U.S. Appl. No. 14/846,417 dated Mar. 23, 2017.
Non-Final Office Action for U.S. Appl. No. 14/846,417 dated Feb. 22, 2018.
Non-Final Office Action on U.S. Appl. No. 16/133,347 dated Jul. 24, 2020.
Non-Final Office Action on U.S. Appl. No. 16/133,347 dated Dec. 27, 2019.
Non-Final Office Action on U.S. Appl. No. 16/133,347 dated Nov. 16, 2018.
Notice of Allowance for U.S. Appl. No. 14/846,417 dated May 30, 2018.
Notice of Allowance on U.S. Appl. No. 16/133,347 dated Aug. 19, 2020.
Pre-Interview Office Action for U.S. Appl. No. 14/846,417 dated Nov. 18, 2016.

* cited by examiner

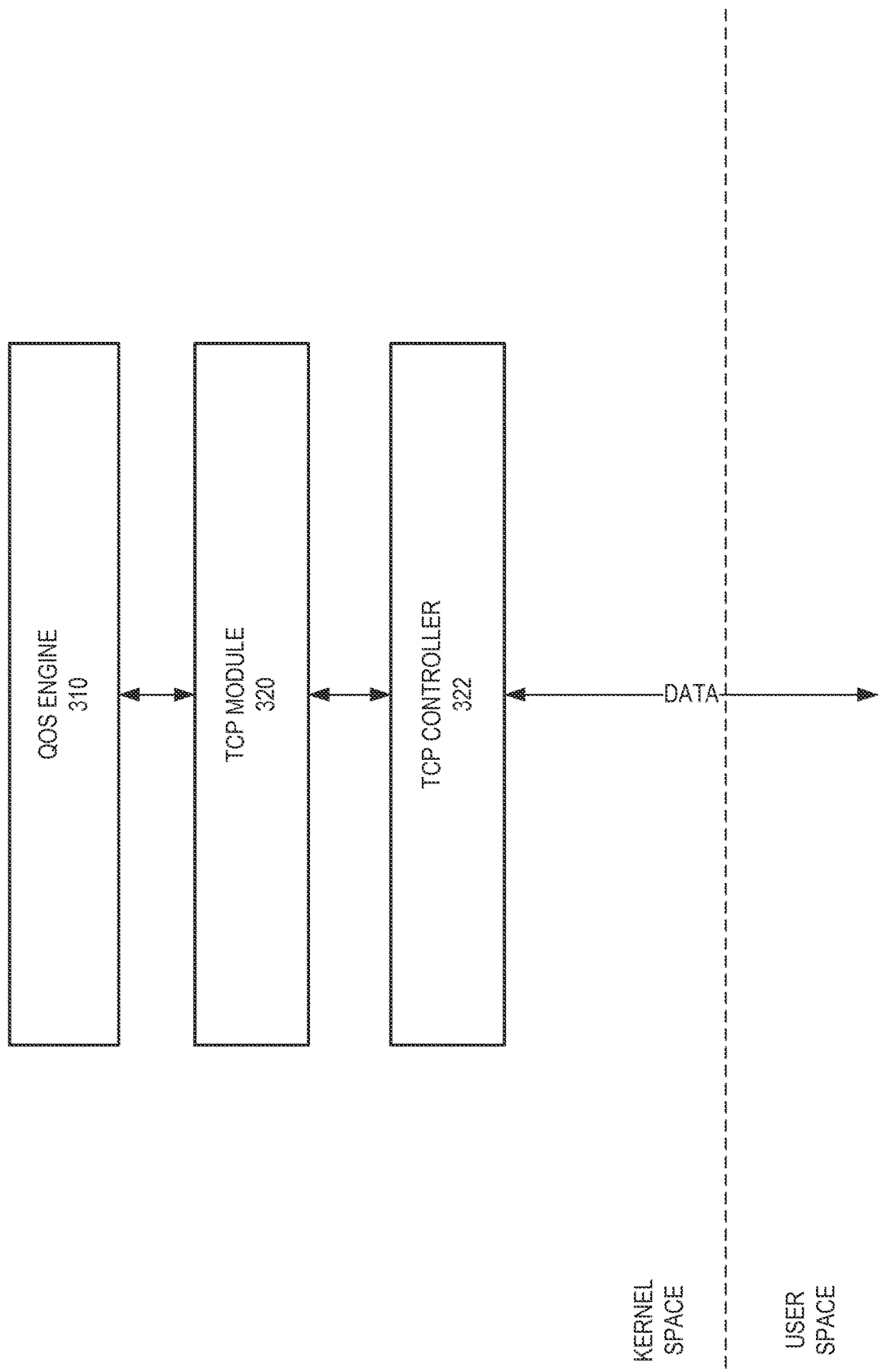

SYSTEM FOR EARLY SYSTEM RESOURCE CONSTRAINT DETECTION AND RECOVERY

CROSS-REFERENCE TO RELATED APPLICATION

This patent application is a continuation of, and claims priority to and the benefit of U.S. patent application Ser. No. 16/133,347, titled "SYSTEM FOR EARLY SYSTEM RESOURCE CONSTRAINT DETECTION AND RECOVERY," and filed Sep. 17, 2018, which is a continuation of, and claims priority to and the benefit of U.S. patent application Ser. No. 14/846,417, titled "SYSTEM FOR EARLY SYSTEM RESOURCE CONSTRAINT DETECTION AND RECOVERY," and filed Sep. 4, 2015, the contents of all of which are hereby incorporated herein by reference in its entirety for all purposes.

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes such as WAN optimizers sometimes optimize internet traffic by performing computation of network traffic packets passing from local area network ("LAN") to WAN. Bursts of sudden increases in traffic across a number of connections may result in packet processing queue build up. As a result of the limited appliance resources such as CPU capacity and available memory, the appliance may experience transmission latency in processing the packets. Consequently, users sending and receiving Internet traffic across the middlebox appliance could experience poor quality of service resulting from the resource crunch.

SUMMARY

In some aspects, a system for optimizing network traffic is described. The system can include a quality of service (QoS) engine configured to acquire information regarding a plurality of data packets comprising a plurality of data packet flows operating over a plurality of links. The QoS engine can be further configured to determine a flow priority to the plurality of data packets flows, and to determine TCP characteristics for the plurality of data packet flows. The system further includes a TCP controller configured to acquire the flow priority to the plurality of data packets from the QoS engine. The TCP controller can be configured to obtain queue information associated with the plurality of data packets, and adjust a receive window size based on the flow priority and the queue information.

In another aspect, a method for optimizing network traffic is described. The method can include acquiring information regarding a plurality of data packets comprising a plurality of data packet flows operating over a plurality of links, determining a flow priority to the plurality of data packets flows, determining TCP characteristics for the plurality of data packet flows, obtaining queue information associated with the plurality of data packets, and adjusting a receive window size based on the flow priority and the queue information.

In yet another aspect, non-transitory computer readable storage medium is described. The storage medium stores a set of instructions that are executable by at least one processor of an appliance to cause the appliance to perform a method for optimizing network traffic. The method can include acquiring information regarding a plurality of data packets comprising a plurality of data packet flows operating over a plurality of links, determining a flow priority to the plurality of data packets flows, determining TCP characteristics for the plurality of data packet flows, obtaining queue information associated with the plurality of data packets, and adjusting a receive window size based on the flow priority and the queue information.

BRIEF DESCRIPTION OF THE DRAWINGS

Reference will now be made to the accompanying drawings showing example embodiments of this disclosure. In the drawings:

FIG. 3B is a block diagram of a portion of an exemplary appliance illustrated in FIG. 3A, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide early system resource constraint detection and recovery. The early detection and recovery of system resource constraints can provide better user experience for high priority traffic and improve the efficiency of the network data flow through optimization of the bandwidth.

Figure 1:
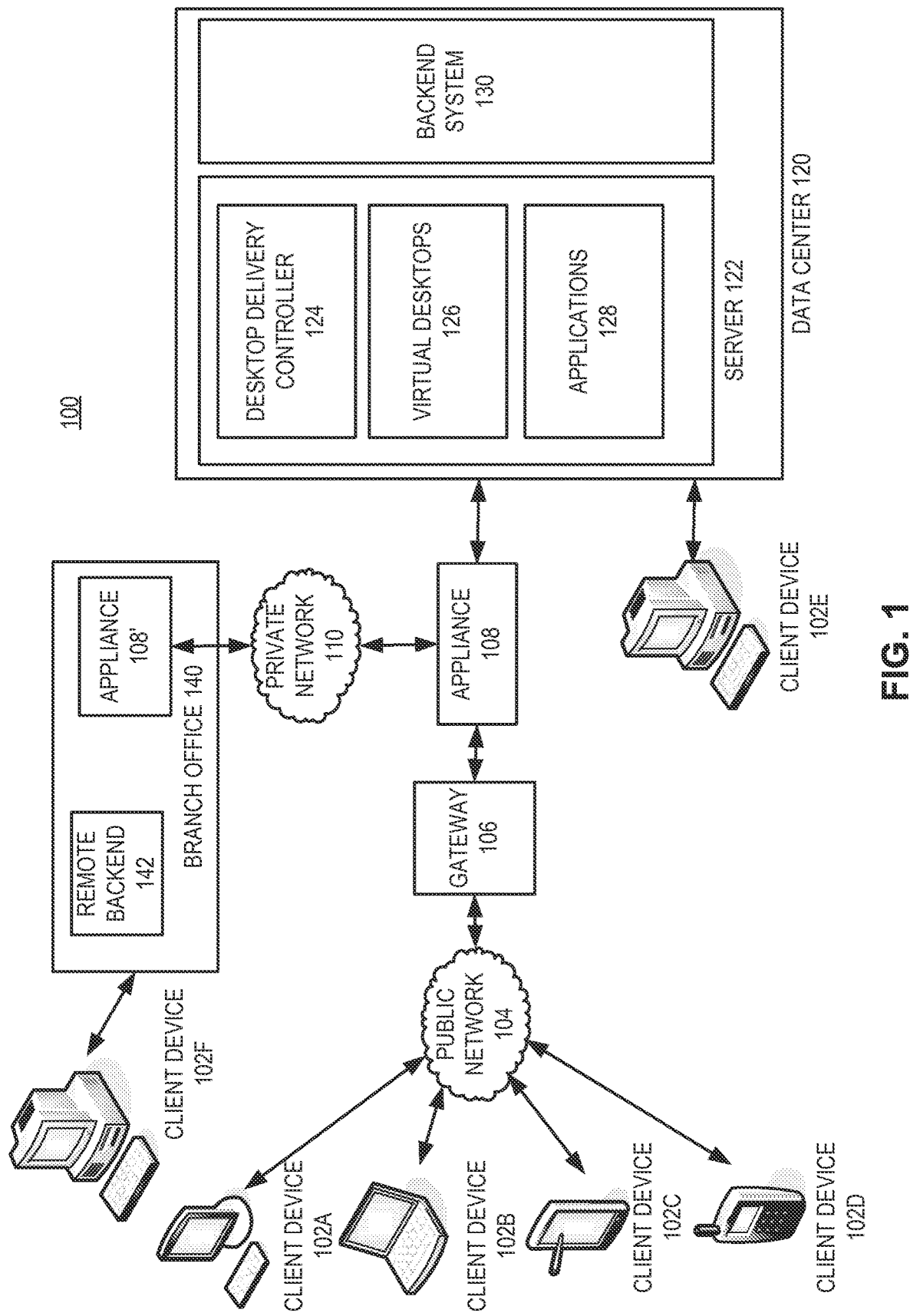
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f).

When client device 102 communicates through public network 104 or private network 110, a communication link can be established. For example, a link can be established by public network 104, gateway 106, and appliance 108, thereby providing a client device (e.g. client devices 102*a-d*) access to data center 120. A link can also be established by branch office 140 including appliance 108', private network 110, and appliance 108, thereby providing a client device (e.g. client device 102*f*) access to data center 120. While client devices 102 are portrayed as a computer (e.g., client devices 102*a*, 102*e*, and 102*f*), a laptop (e.g., client device 102*b*), a tablet (e.g., client device 102*c*), and a mobile smart phone (e.g., client device 102*d*), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Moreover, in some embodiments, appliance 108 and gateway 106 can be part of the same device. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102*a-f* or branch office 140). For example, applications 128 can include Microsoft Windows™-based applications and computing resources.

Desktop delivery controller 124 is a device that enables delivery of services, such as virtual desktops 126 to client devices (e.g., client devices 102*a-f* or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102*f* can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
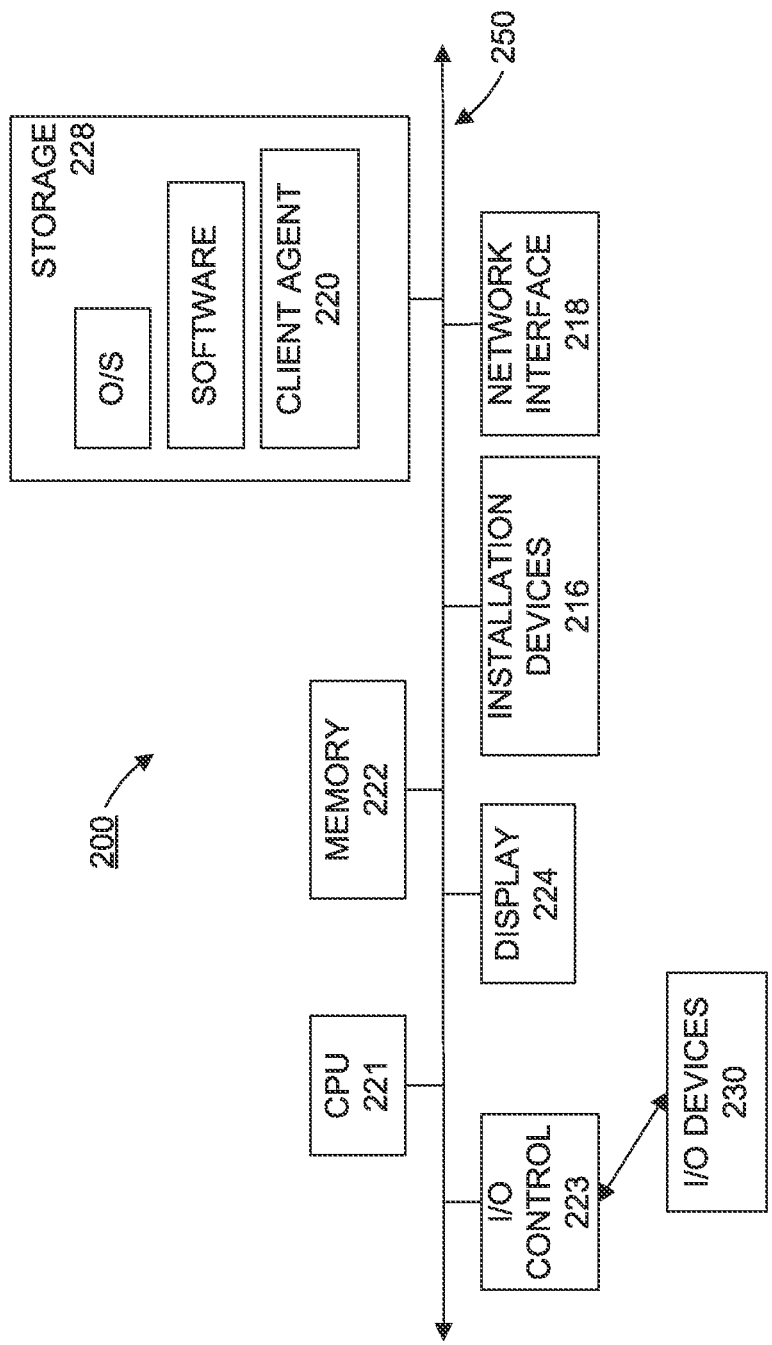
FIGS. 2A-2B are block diagrams of an exemplary computing device, consistent with embodiments of the present disclosure.
Figure 2B:
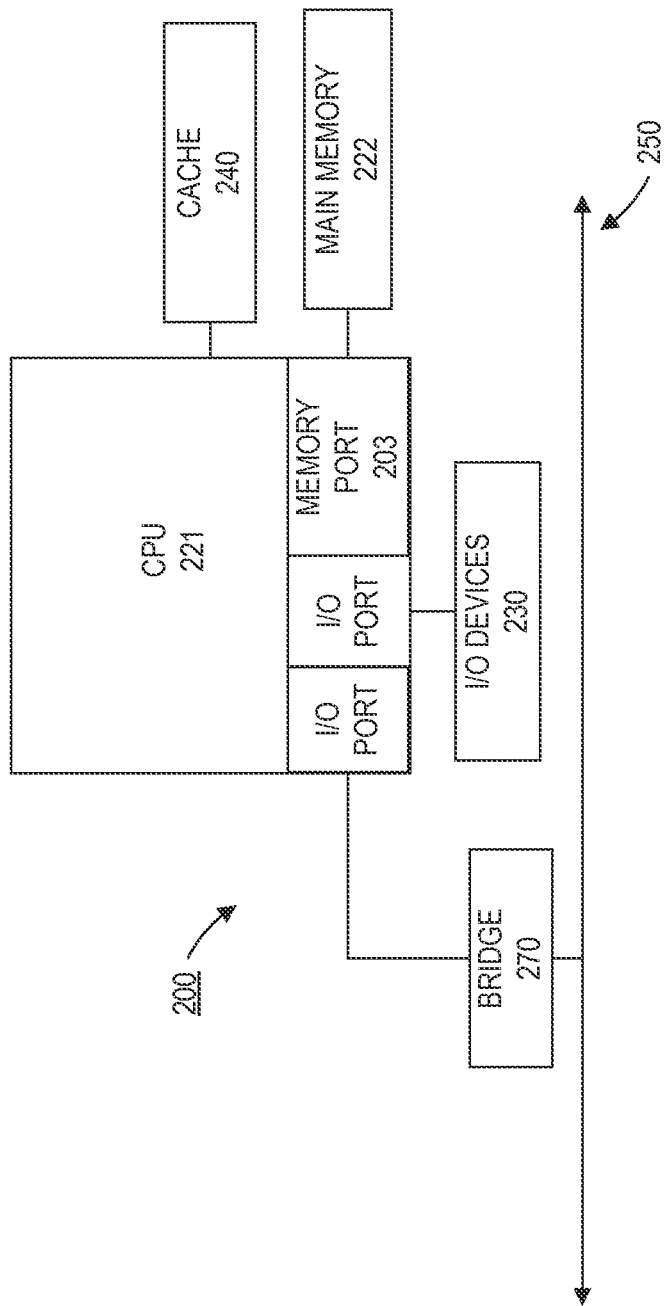

As shown in FIGS. 2A-2B, each computing device 20 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPI 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 20 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 20 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 20 to any type of network capable of communication and performing the operations described herein.

Figure 3A:
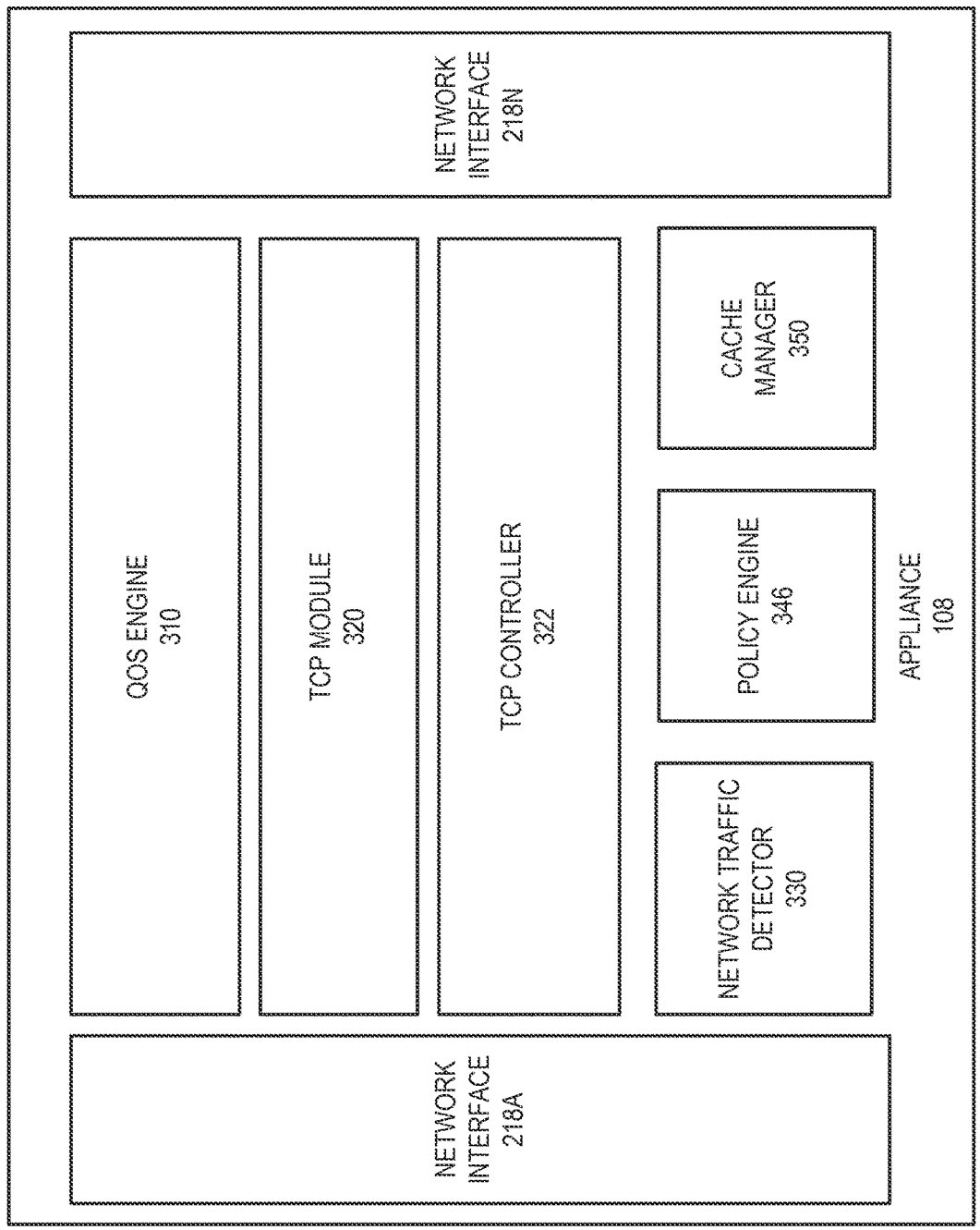
FIG. 3A is a block diagram of an exemplary appliance illustrated in FIG. 1, consistent with embodiments of the present disclosure.

FIG. 3A is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a QoS engine 310, one or more TCP modules 320, one or more TCP controllers 322, one or more network traffic detectors 330, a policy engine 346, and a cache manager 350. Although FIG. 3A depicts network interfaces 218A-218N as two network interfaces, it is appreciated that interfaces 218A-218N can include any number of network interfaces.

QoS engine 310, which is also referred to as a "QoS controller," or a "QoS packet scheduler," can process data packets according to their scheduled priorities and perform one or more optimization (e.g., Quality of Service "QoS") techniques, including the application of one or more TCP traffic prioritization algorithms, etc. QoS engine 310 can be one or more modules, which can be one or more packaged functional software and/or hardware units designed for use with other components or a part of a program that performs a particular function (e.g., optimization techniques), corresponding to the particular step, of related functions. QoS engine 310 can be configured to improve the performance, operation, or quality of service of any type of network traffic. QoS engine 310 performs these techniques, for example, by using defined logic, business rules, functions, or operations. In some embodiments, QoS engine 310 can perform network traffic optimization and management mechanisms that provide different priorities to different users, applications, flows, or links. QoS engine 310 can also control, maintain, or assure a certain level of performance to a user, application, flow, or connection. QoS engine 310 can direct TCP module 320 to perform any or all steps for determining one or more receive windows using one or more TCP characteristics and TCP traffic priority. For example, QoS engine 310 can control, maintain, prioritize and/or assure a certain portion of bandwidth or network capacity of a communication link for a user, application, one or more flows, or links, collect data in connection with one or more flows and links, analyze the collected data, select a TCP flavor suitable for avoiding TCP traffic congestion on the one or more flows.

In some embodiments, QoS engine 310 can monitor the achieved level of performance or the quality of service (e.g., the data rate, delay, queue length, dropped packets, etc.) corresponding to a user, application, and/or flow, or link, and then dynamically control or adjust one or more TCP characteristics in connection with sending and receiving data packets to achieve the desired level of performance or quality of service. QoS engine 310 can direct TCP module 320 to perform some or all of the steps according to exemplary embodiments disclosed herein. For example, QoS engine 310 can coordinate the acquisition and delivery of TCP characteristics between TCP controller 322 and TCP module 320. QoS engine 310 can also coordinate the acquisition and delivery of link characteristics between components of appliance 108, such as, for example, between network traffic detector 330, TCP module 320, and TCP controller 322.

TCP module 320, which is also referred to as a "packet engine," a "packet processor," or a "data processor," is responsible for controlling and managing the processing of data packets received and transmitted by appliance 108 via network interfaces 218A-N. TCP module 320 can be one or more modules, which can be one or more packaged functional hardware units designed for use with other components or a part of a program that performs a particular function (e.g., controlling and managing the processing of data packets), corresponding to the particular step, of related functions. TCP module 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). TCP module 320 can be configured to accomplish some or all of the steps described herein after being executed by CPU 221 and/or QoS engine 310. In some aspects, the data packets can be carried over the data link layer via the Ethernet communication protocol, which can comprise any of the family of WAN or LAN protocols, such as those protocols covered by the IEEE 802.3. In other aspects, the network stack can have any type and form of wireless protocols, such as IEEE 802.11 and/or mobile internet protocols. In some embodiments, TCP module 320 intercepts or receives data packets at the network layer, such as via the IP communication protocol. In some embodiments, TCP module 320 can intercept or receive data packets at the transport layer, such as via the TCP communication protocols. TCP module 320 can operate at any session or any application layer above the transport layer.

TCP module 320 can include a buffer for queuing one or more data packets during processing of the data packets. Additionally, TCP module 320 can communicate via one or more communication protocols to transmit and receive a plurality of network data packets across one or more links via network interfaces 218A-N. The links can connect appliance 108 to appliance 108'. TCP module 320 can be configured to acquire data regarding the flow and store, the acquired data in an operatively connected computer memory. The sent and received data packets operating across one or more links can be considered "data flows" or "flows." In some embodiments, TCP module 320 can send scheduling requests to QoS engine 310 for scheduling of data packets received and stored at TCP module 320. TCP module 320 can determine one or more TCP characteristics of the flow based on the stored data. A TCP characteristic, as discussed in further detail below, includes a plurality of information such as, for example, packet round trip times and/or the packet loss rate for a particular data flow, an average queuing delay and/or bandwidth delay product for the packets sent and received across a particular link, receive window drop information, and/or other receive window information such as receive window size, among other things.

During operations of appliance 108, TCP module 320 can interface, be integrated with, or be in communication with any portion of appliance 108, such as QoS engine 310, TCP controller 322, network traffic detector 330, policy engine 346, and/or cache manager 350. As such, any of the logic, functions, or operations of QoS engine 310, TCP controller 322, network traffic detector 330, policy engine 346, and/or cache manager 350 can be performed in conjunction with or in responsive to TCP module 320. TCP controller can be controlled by and/or execute any operation described herein.

In some aspects, one or more TCP controllers 322 can be configured to send and receive flow information from TCP module 320, and/or QoS engine 310. TCP controller 322 can be configured to acquire one or more TCP characteristics from TCP module 320, acquire one or more flow priorities from and determine a receive window size based on the TCP characteristics and the one or more flow priorities. Because the flow characteristics change with time during the receive window determination process, the selection is said to be "dynamic." TCP characteristics can include one or more characteristics that change with time, such as, for example, packet round trip times and/or the packet loss rate for a particular data flow, an average queuing delay for the packets sent and received across a particular link, and/or receive window information. TCP controller 322 can be one or more modules, which can be one or more packaged functional hardware units designed for use with other components or a part of a program that performs a particular function (e.g., controlling and managing the processing of data packets), corresponding to the particular step, of related functions.

One or more network traffic detectors 330 can include any logic, business rules, functions, or operations for automatically detecting the type of network traffic corresponding to data packets acquired by TCP module 320. Network traffic detector 330 can be one or more modules, which can be one or more packaged functional hardware units designed for use with other components or a part of a program that performs a particular function (e.g., acquire one or more link characteristics), corresponding to the particular step, of related functions. As described above, TCP module 320 can store and transmit data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detector 330 can detect the type of network traffic received at TCP module 320 by any available techniques, such as by using IP addresses. Network traffic detectors 330 can also determine a link type, a bandwidth, and/or other characteristics associated with one or more flows.

Appliance 108 can also include a policy engine 346, also referred to as a policy controller or a policy provider. Policy engine 346 can include any logic, function, or operations for providing and applying one or more policies or rules to the function, operation, or configuration of any portion of the appliance 108. Policy engine 346 can be one or more modules, which can be one or more packaged functional hardware units designed for use with other components or a part of a program that performs a particular function, corresponding to the particular step, of related functions. In some embodiments, policy engine 346 provides a configuration mechanism to allow a user to identify, specify, define, or configure a policy for appliance 108, or any portion thereof. For example, policy engine 346 can provide a predefined traffic optimization configuration policy including the number of priorities, the priorities associated with each service class, the number of connections allowed under each service class, link bandwidth configuration, and any other policy information. Policy engine 346 can also provide policies for what data to cache, when to cache the data, for whom to cache the data, when to expire an object in cache, or when to refresh the cache. Policy engine 346 can also include any logic, rules, functions, or operations for determining and providing access, control, and management of data packets received and stored by TCP module 320. Policy engine 346 can also include any logic, rules, functions, or operations for determining and providing access, control and management of security, network traffic, network access, compression, or any other function or operation performed by appliance 108.

Cache manager 350 can include software, hardware, or any combination of software and hardware to store data, information, and objects to a cache in memory or storage; to provide cache access; and to control and manage the cache. The data, objects, or content processed and stored by cache manager 350 can include data in any format, such as a six-byte MAC address, a TCP data packet, or any type of data communicated via any communication protocol. Examples of types of data can include, for example, one or more TCP characteristics including information in connection with packet loss rates, queuing delays, flow congestion, sizes of receive windows, bandwidth of one or more links, average round trip times, etc. Cache manager 350 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of appliance 108. In some embodiments, the cache can comprise any type and form of storage element of appliance 108, such as a portion of a hard disk. In some embodiments, as described above, the processing unit of the device, such as CPU 221, can provide cache memory for use by cache manager 350. Cache manager 350 can use any portion and combination of main memory 222, storage 228, or CPU 221 for caching data, objects, and other content. Cache manager 350 can comprise any type of general purpose processor (GPP), or any other type of integrated circuit, such as a Field Programmable Gate Array (FPGA), Programmable Logic Device (PLD), or Application Specific Integrated Circuit (ASIC). Cache manager 350 can be one or more modules, which can be one or more packaged functional hardware units designed for use with other components or a part of a program that performs a particular function, corresponding to the particular step, of related functions.

FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In some aspects, the kernel space can also include a number of network services or processes working in conjunction with QoS engine 310, TCP module 320, TCP controller 322, or any portion thereof. Additionally, the embodiments of the kernel can depend on the operating system installed, configured, or otherwise used by appliance 108.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space.

Figure 4:
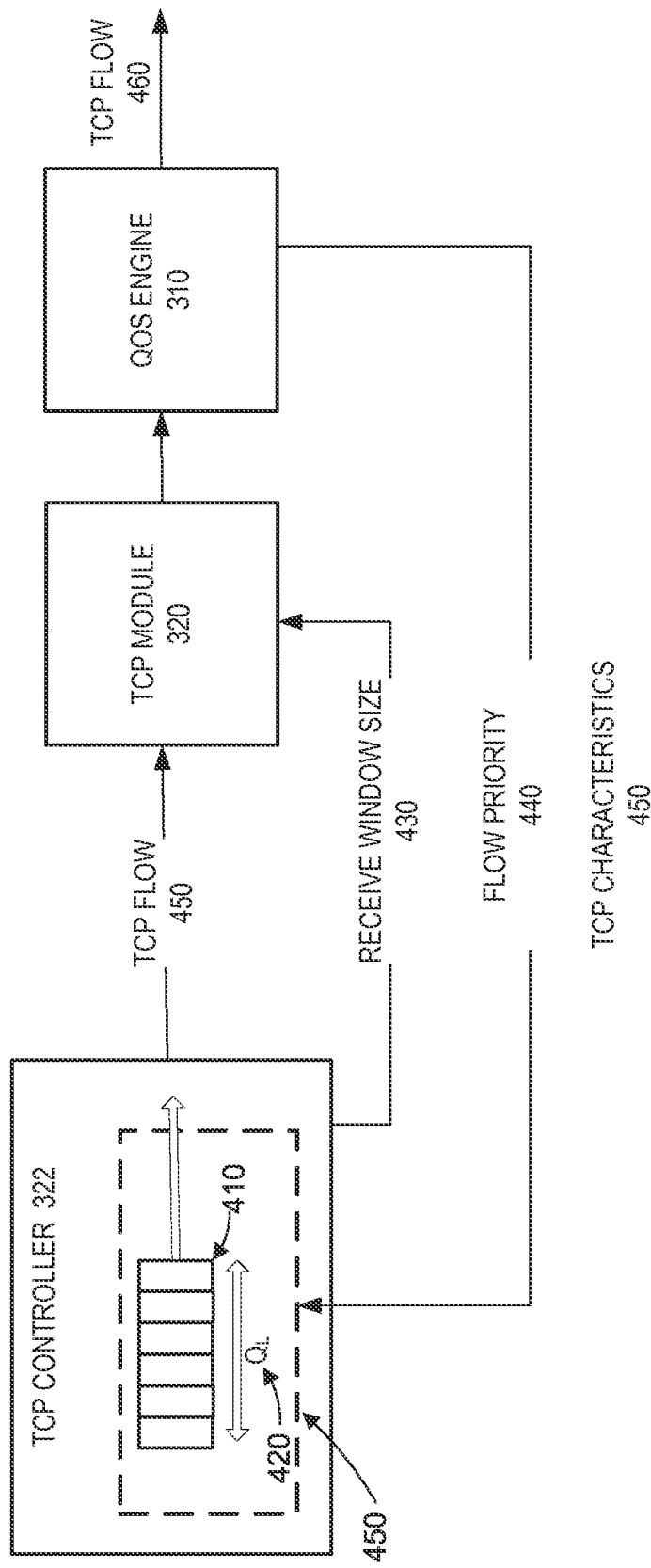
FIG. 4 is a block diagram of an exemplary embodiment for early resource constraint detection and recovery, consistent with embodiments of the present disclosure.

FIG. 4 is a block diagram of an exemplary embodiment for determining a receive window size 430, consistent with embodiments of the present disclosure. TCP controller 322 can be configured to receive both static input and dynamic input, and use both inputs to determine a receive window size 430. Static input can include one or more TCP link characteristics that include information regarding one or more links across which one or more flows 460 are operating. Examples of a TCP link characteristic can include bandwidth information, link types, and/or the number of active TCP connections, among other things, between two link terminals (e.g., between appliance 108 and appliance 108'). TCP characteristics 450 can also include dynamically-changing information in connection with packet loss rates, queue lengths, queuing delays, flow congestion, sizes of receive windows, average round trip times, and/or other information in connection with active flow 460. A flow is active when packets are being sent and received across a TCP link. Although FIG. 4 depicts TCP flow 460 as a single data flow, those skilled in the art appreciate that TCP flow 460 may include many flows of data packets operating across a plurality of TCP connections.

In TCP connections, the receive window is one of the factors used to determine the number of bytes that can be outstanding in an active flow at a given time. In some embodiment, congestion window can be another factor governing the rate of transmission (e.g., where the appliance uses a minimum-value algorithm based on congestion window and receiving window inputs). Receive windows are a means of controlling a link between two link terminals from being overloaded with too much traffic. In general, TCP controller 322 can optimize receive window size 430 by determining how much data can be sent to the receiver of the data without getting an acknowledgement from the receiver. The receive window also allows the receiver to acknowledge several packets in one acknowledgement transmission. The data sender generally maintains the receive window size. Receive windows can control packet throughput and packet loss due to, for example, buffer constraints at the receiver which may be owing to system latency. If the receive window is too large, then the sender will spend a lot of time resending the entire receive window every time packet loss is detected by the receiver. If the receive window is too small, then the sender packets can be blocked constantly because the receive window may be populated with packets before the data receiver is able to acknowledge that it has received the packets.

Referring now to FIG. 4, an exemplary TCP controller 322 can be configured to control the packet processing queue by manipulating the receive window size 430 of the LAN side TCP connections-based on a flow priority 440 and dynamically-changing TCP characteristics 450. The TCP characteristics can be derived empirically from a sampled list of previously seen long-lived TCP links by recording the congestion related parameters for each sampled flow. In some aspects, appliance 108 can improve network speed, efficiency and quality of service by determining a receive window that avoids packet loss of high priority traffic due to traffic congestion.

According to some embodiments, TCP controller 322 can predict system resource crunch situations in the leased line and/or broadband links. For every P1 flow detected by TCP controller 322 for system resource crunch situations, appliance 108 can reduce the receive window size of a non-P1 connection. In the event that TCP controller 322 still detects early crunch situations for the same P1 connection, it can limit another non-P1 flow, and can be further extrapolated for 'n' number of additional P1 connections.

In some aspects, TCP controller 322 can acquire feedback signals from QoS engine 310, and determine a threshold value on the packet processing queue usable for detecting and correcting constraints on appliance system resources. For example, according to some embodiments, TCP controller 322 can actively monitor the TCP packet queue 410 for early detection of a resource crunch (e.g., an over-use of system resources including memory, CPU usage, etc.) by acquiring flow priorities 440 of TCP connections and TCP characteristics 450 from QoS engine 310. TCP characteristics 450 can include information associated with packet queue 410, such as, for example queue length 420. Queue length 420 describes a current length of the queue (in data packets). Using flow priority 440 and TCP characteristics 450, TCP controller 322 can be configured to detect system resource congestion due to a buildup of packet queue 410, and manipulate the receive window size 430 sent to TCP module 320. More particularly, after detecting early congestion based on TCP characteristics 450 and flow priority 440, TCP controller 322 can control the least priority TCP traffic by reducing the receive window size 430 of the least priority active TCP connections. By slowing the least priority TCP traffic, appliance 108 can avoid congestion for higher priority ("P1") flows and provide additional throughput and decreased packet loss for the P1 traffic. According to some embodiments, appliance 108 can also ensure that the non-P1 traffic is not starved by ensuring that the receive window of non-P1 flows are reduced by a predetermined maximum value only once during a predetermined interval of time. For example, the receive windows of non-P1 flows can be reduced by a predetermined value of x packets every 100 round trip times (RTTs), and/or be increased by a predetermined value after another period of time.

According to some embodiments, TCP module 320 can continually monitor the traffic for a predetermined period of time, and continually provide dynamic feedback to TCP controller 322. Although a predetermined period of time can vary based on application, it is contemplated that TCP module 320 can monitor traffic for periods of several seconds to periods of time spanning several minutes before calculating TCP characteristics 450. Accordingly, appliance 108 can manage latency and packet queue 410, provide greater P1 traffic throughput with fewer P1 lost packets, and provide an improved user experience due to system speed and stability.

Figure 5:
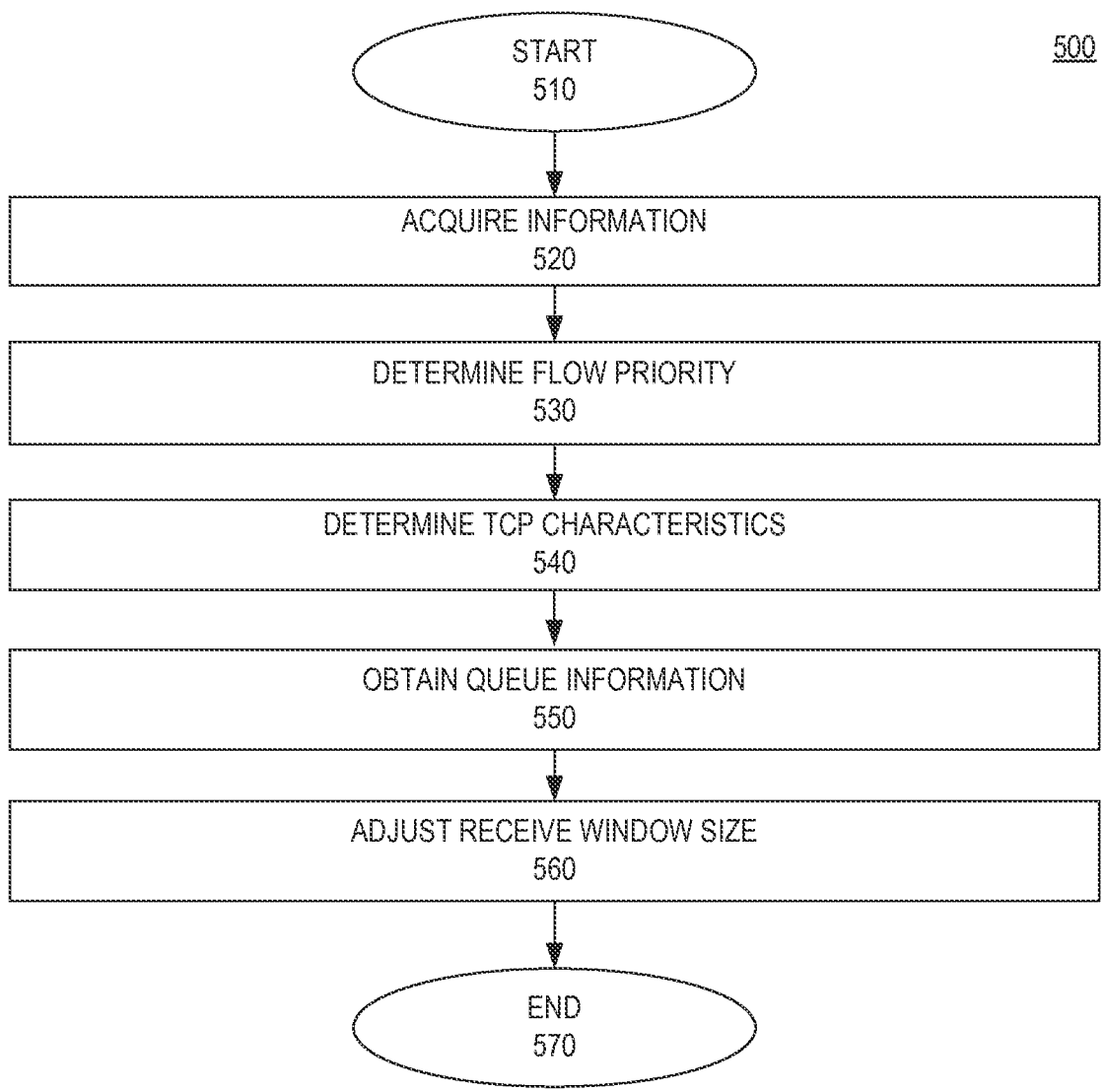
FIG. 5 is a flowchart representing an exemplary method of modifying a plurality of packet flows, consistent with embodiments of the present disclosure.

FIG. 5 is a flowchart representing an exemplary method 500 for modifying a flow, consistent with embodiments of the present disclosure. It will be readily appreciated that the illustrated procedure can be altered to delete steps or further include additional steps. While method 500 is described as being performed by an appliance (e.g., appliance 108), it is appreciated that method 500 can be performed by other devices alone or in combination with the appliance. After an initial start step 510, appliance 108 sends and receives a plurality of data packets comprising an active flow that are operating across a link between two link terminals (e.g., between appliance 108 and appliance 108'). At step 520, appliance 108 can acquire and store information regarding the active flows to an operatively connected computer-readable memory.

At step 530, appliance 108 determines flow priority for each of the plurality of data packet flows. According to some embodiments, appliance 108 also determines TCP characteristics at step 540. A TCP characteristic can include a plurality of information such as, for example, flow priorities for one or more TCP flows, packet round trip times and/or the packet loss rate for a particular data flow, an average queuing delay and/or bandwidth delay product for the packets sent and received across a particular link, receive window drop information, and/or other receive window information such as receive window size, a queue threshold, and buffer memory size, among other things.

At step 550, appliance 108 obtains queue information. Appliance 108 may query TCP controller 322, TCP module 320, and/or QoS engine 310 to obtain queue information. Queue information can include queue length 420 ("$Q_L$"), a queue threshold ("$Q_T$"), and maximum queue length ("$Q_H$"). An internet appliance (such as, e.g., appliance 108) typically maintains a set of queues that hold packets scheduled to go out on that interface. When packets arrive at an appliance, they have to be processed and transmitted. An appliance can only process a limited number of packets at a time. The upper limit is the queue threshold ($Q_T$). If packets arrive faster than the appliance 108 can process them (such as in a burst transmission) the appliance 108 puts them into the queue (also called the buffer) until it can get around to transmitting them. Delay can also vary from packet to packet so averages and statistics are usually generated when measuring and evaluating queue length ($Q_L$). The maximum queuing length $Q_H$ is generally proportional to buffer memory size. The longer the line of packets waiting to be transmitted $Q_L$, the longer the average waiting time is. The appliance 108 queue of packets waiting to be sent also introduces a potential cause of packet loss. Since an appliance has a finite amount of buffer memory to hold the queue, an appliance that receives packets at too high a rate may experience a full queue, and thus, may experience a resource crunch due to the constraints on memory and processing ability. In this case, the appliance has no other option than to simply discard excess packets.

With queue length 420 ($Q_L$), maximum queue length $Q_H$, and queue threshold $Q_T$ determined, appliance 108 may determine a ratio at which the current queue length $Q_L$ 420 exceeds the queue threshold $Q_T$. The ratio ("R") is determined by, $$R=(Q_L-Q_T)/(Q_H-Q_T) \text{ for } Q_L>Q_T.$$

While the determination of the total receive window can involve a calculation (as shown above), it is appreciated that the determination can involve other mechanisms, such as using a look-up table.

At step 560, appliance 108 adjusts receive window size 430. Appliance 108 may obtain TCP characteristics 450 and flow priority information 440 in connection with the active TCP connections, and use TCP characteristics 450 and flow priority information 440 in the receive window size adjustment. According to some embodiments, appliance 108 can select 'n' least priority active TCP connections where the number 'n' is proportional to the ratio R. For example, if the ratio at which the queue exceeded the queue threshold $Q_T$ is 0.4, then appliance 108 selects approximately 40% of the active TCP connection. It is appreciated that depending on the number of active TCP connections, the selection of exactly 40% of all connections may not be possible, and rounding up or down may occur.

To preserve the maximum amount of higher priority P1 connections, appliance 108 selects approximately 40% of least priority (non-P1) connections. Accordingly, appliance 108 can control the transmission rate of the most important TCP connections by setting the receive window size 430 to a smaller value say (e.g., 8 kB) for a short period of time. After the queue length 420 gets below the threshold $Q_T$, appliance 108 can reset receive window size 430 back to the size of the available buffer memory. Thus by controlling the receive window size appliance 108 can prevent starvation of new connections. According to some embodiments, appliance 108 can perform better prioritization of traffic, as high priority traffic will be given importance through active control of receive window size 430.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method comprising:
    identifying, by a device, a length and a threshold for the length of a queue for storing data packets of a plurality of data packet flows to be communicated via a network interface;
    identifying, by the device, one or more data packet flows of the plurality of data packet flows using a ratio of an amount by which the length of the queue exceeds the threshold length of the queue to an amount by which a maximum length of the queue exceeds the threshold for the length of the queue;
    adjusting, by the device, a window size of the one or more data packet flows of the plurality of data packet flows based at least on a priority of the one or more data packet flows and the length and the threshold for the length of the queue; and
    receiving, by the device, one or more data packets for the one or more data packet flows based at least on the adjusted window size.

2. The method of claim 1, further comprising identifying, by the device, the one or more data packet flows based at least on the length and the length of the queue.

3. The method of claim 1, further comprising identifying, by the device, a number of the one or more data packet flows proportional to the ratio.

4. The method of claim 1, further comprising identifying, by the device, the one or more data packet flows based at least on the priority.

5. The method of claim 1, further comprising communicating, by the device, the one or more data packets for the one or more data packet flows via the network interface based at least on the adjusted window size.

6. The method of claim 1, further comprising communicating, by the device, the one or more data packets to a client or a server.

7. A device comprising:
    one or more processors, coupled to memory and configured to:
    identify a length and a threshold for a length of a queue for storing data packets of a plurality of data packet flows to be communicated via a network interface;
    identify one or more data packet flows using a ratio of an amount by which the length of the queue exceeds and the threshold for the length of the queue to an amount by which a maximum length of the queue exceeds the threshold for the length of the queue;
    adjust a window size of the one or more data packet flows of the plurality of data packet flows based at least on a priority of the one or more data packet flows and the length and the threshold for the length of the queue; and
    receive one or more data packets for the one or more data packet flows based at least on the adjusted window size.

8. The device of claim 7, wherein the one or more processors are further configured to identify the one or more data packet flows based at least on the length and the threshold for the length of the queue.

9. The device of claim 7, wherein the one or more processors are further configured to identify a number of the one or more data packet flows proportional to the ratio.

10. The device of claim 7, wherein the one or more processors are further configured to identify the one or more data packet flows based at least on the priority.

11. The device of claim 7, wherein the one or more processors are further configured to communicate the one or more data packets for the one or more data packet flows based at least on the adjusted window size.

12. The device of claim 7, wherein the device is intermediary to one or more client devices and one or more servers.

13. A system, comprising:
    a network interface;
    a queue configured to store one or more data packets of a plurality of data packet flows to be communicated via the network interface;
    one or more processors configured to:
    identify one or more data packet flows of the plurality of data packet flows using a ratio of an amount by which the length of the queue exceeds the threshold for the length of the queue to an amount by which a maximum length of the queue exceeds the threshold for the length of the queue;
    adjust a window size of the one or more data packet flows of the plurality of data packet flows based at least on a priority of the one or more data packet flows and a length and a threshold for the length of the queue; and
    receive via the network interface one or more data packets for the one or more data packet flows based at least on the adjusted window size.

14. The system of claim 13, wherein the one or more processors are further configured to identify the one or more data packet flows based at least on the length and the threshold for the length of the queue.

15. The system of claim 13, wherein the one or more processors are further configured to identify a number of the one or more data packet flows proportional to the ratio.

16. A computer-implemented method comprising:
    identifying a length and a threshold for the length of a queue for storage of data packets;
    identifying one or more data packet flows of a plurality of data packet flows using a ratio of an amount by which the length of the queue exceeds the threshold for the length of the queue to an amount by which a maximum length of the queue exceeds the threshold for the length of the queue;
    adjusting a window size of the one or more data packet flows of the plurality of data packet flows based at least on a priority of the one or more data packet flows and the length and the threshold for the length of the queue; and receiving at least one data packet of the one or more data packet flows based at least on the adjusted window size.

* * * * *